June 12, 1951

N. D. COOPER 2,556,318

ELECTRICALLY OPERATED SERVOPOWER ACTUATOR

Filed April 5, 1947

INVENTOR.
NELSON D. COOPER

BY

Toulmin & Toulmin

ATTORNEYS.

June 12, 1951 N. D. COOPER 2,556,318
ELECTRICALLY OPERATED SERVOPOWER ACTUATOR
Filed April 5, 1947 2 Sheets-Sheet 2

INVENTOR.
NELSON D. COOPER
BY
Toulmin + Toulmin
ATTORNEYS.

Patented June 12, 1951

2,556,318

UNITED STATES PATENT OFFICE 2,556,318

ELECTRICALLY OPERATED SERVO POWER ACTUATOR

Nelson D. Cooper, Mariemont, Ohio, assignor to The R. K. Le Blond Machine Tool Co., Cincinnati, Ohio, a corporation of Delaware Application April 5, 1947, Serial No. 739,629

2 Claims. (Cl. 192—4)

This invention relates to a power driven actuator or servo for variably positioning a driven element to cause it to follow accurately the positional changes of a controlling element. More particularly, this invention relates to tracer controlled servo actuators of the type in which a frictionally driven flywheel in conjunction with a brake is utilized to prevent hunting.

In prior actuators of this type, where a frictionally driven flywheel only is used to prevent hunting, the greater the accuracy obtained, the greater the inertia required in the flywheel to prevent hunting. A large amount of inertia in the flywheel is not objectionable when following gradual changes in direction, but it is objectionable when starting and stopping quickly to form a right-angle shoulder. A large amount of inertia in the flywheel will also cause too much delay in accelerating when starting and decelerating when stopping, resulting in inaccurate following control.

One of the objects of the present invention is to provide a frictional flywheel type power actuator adapted to position a driven element with much greater accuracy and stability than has been possible heretofore. This object is obtained by providing a combination of a frictional flywheel and a magnetic brake in a power driven servo in which energy is applied to the driving train selectively through the medium of low inertia power transmitting devices such as frictional clutches. The magnetic brake permits the use of a low inertia frictional flywheel while at the same time avoiding hunting. This permits more rapid acceleration and deceleration and results in a higher degree of accuracy and following than heretofore possible, particularly when high rates of relative length feed are utilized.

Still another object of this invention is to provide an electrical tracer controlled servo mechanism for a machine tool which is simple in construction and highly efficient and accurate in operation.

It is a still further object of this invention to provide an electrically operated tracer controlled servo mechanism having a constant speed source of power controlled by a tracer during the relative movement of work and tool in which a minimum of hunting and a high degree of accurate following control is provided.

Further features and advantages of this invention will appear from a detailed description of the drawings in which.

Figure 1:
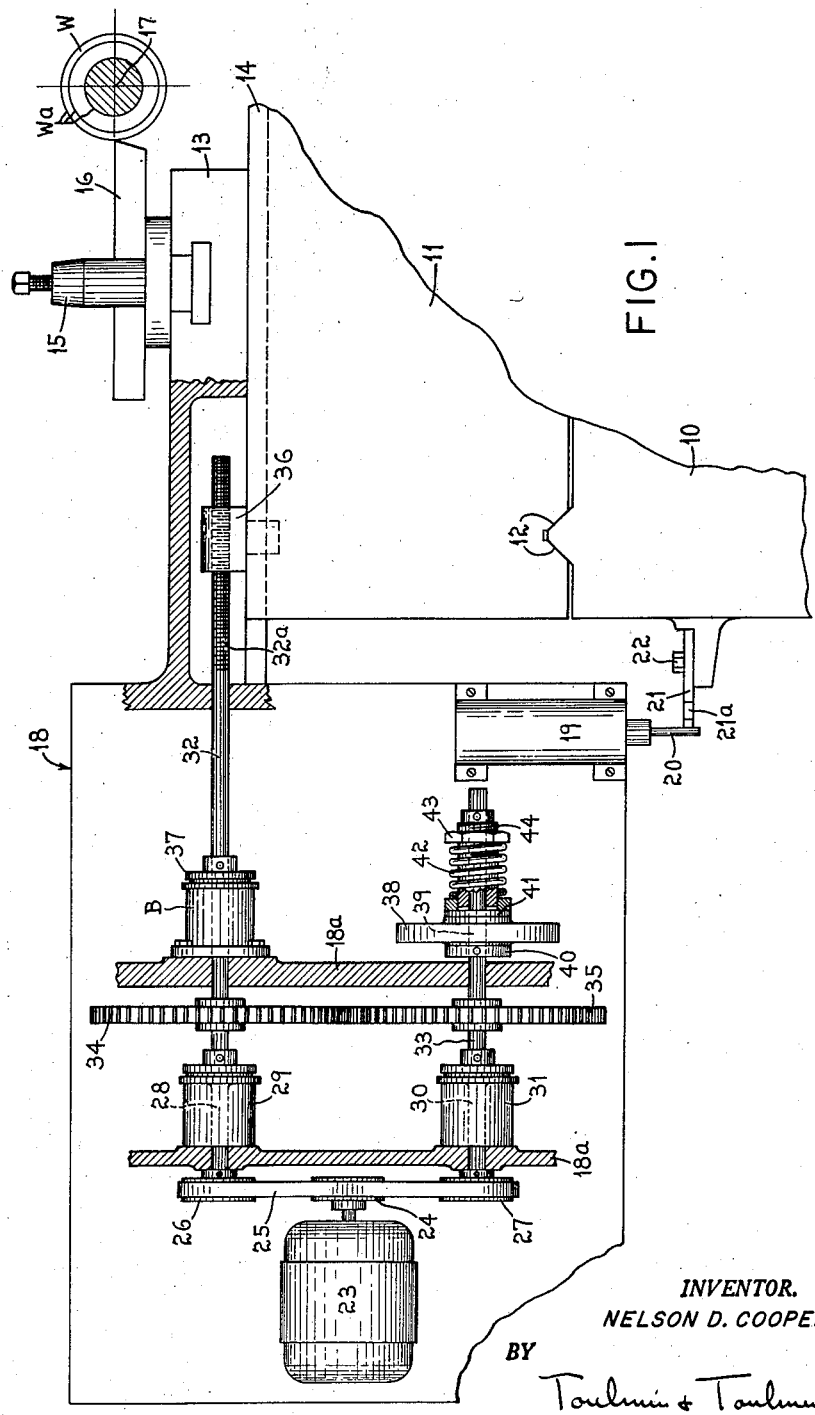
Figure 1 is a diagrammatic view showing an exemplary embodiment of this invention for controlling the movements of a cutting tool in a lathe.

Referring particularly to Figure 1, there is shown diagrammatically an exemplary embodiment of this invention which comprises the application of the electric servo tracer control mechanism to a machine tool or lathe having a bed 10 upon which is longitudinally movable the carriage 11 on the usual guideways 12. The usual actuating mechanism for the carriage 11 (not shown) may be utilized for effecting feeding movement of the carriage on the bed.

On the carriage 11 is provided the tool slide 13 on suitable guideways 14 and which carries a tool post 15 containing the cutting tool 16 operating on the work piece W. The work W may be driven by any suitable dog or chuck for rotation about the work spindle axis 17 of the lathe while the tool 16 may be moved in and out relative to this axis to perform a form cutting operation on the periphery of the work W.

Mounted to move with the tool slide 13 is the electric servo control mechanism indicated generally as 18 which has a tracer 19 having a stylus 20 which engages a template 21 fixed to the bed 10 of the lathe by suitable screws 22 and having a form 21a corresponding to the desired form Wa to be reproduced on the work piece W during the relative movement of the carriage 11 along the bed 10 to effect relative movement of the stylus 20 along the surfaces 21a of the template 21.

Power for operating the tool slide 13 in tracer control movement is derived from a constantly operating constant speed motor 23 having a pulley 24 over which operates a belt 25 which drives the pulleys 26 and 27. The pulley 26 is fixed to drive the input shaft 28 of the magnetic clutch 29 while the pulley 27 is connected to drive the input shaft 30 of the magnetic clutch 31. When magnetic clutch 29 is electrically energized, power is transmitted from the shaft 28 to the shaft 32 and when the magnetic clutch 31 is energized, power is transmitted from the shaft 30 to the shaft 33. The shafts 32 and 33 are geared together for synchronous rotation by a pair of gears, 34 fixed to the shaft 32 and 35 fixed to the shaft 33.

The shaft 32 is provided with a threaded end 32a which operates in a nut 36 fixed in the lathe carriage 11 so that when one or the other of the magnetic clutches 29 or 31 is energized the shaft or screw 32 will be rotated in the nut 36 so as to effect in and out movements in the tool slide 13.

Fixed on the framework 18a of the tracer control 18 carried on the tool slide 13 is a magnetic brake B which cooperates with a suitable brake disc 37 fixed to the screw 32 so that whenever the brake B is energized it will stop rotation of the screw 32.

Also coupled to the screw 32, in this case through the gears 34 and 35 and the shaft 33, is a friction damping flywheel 38 journaled for free rotation at 39 on the shaft 33 and being positioned against a fixed collar 40 mounted on the shaft 33 and held with a predetermined frictional tension against the collar 40 by a second friction collar 41 keyed to the shaft 33 but slidable therealong and normally forced toward the flywheel 38 by a suitable spring 42 whose tension may be regulated by an adjusting nut 43. The nut 43 is carried by a sleeve 44 fixed against movement on the shaft 33 so that the spring 42 will force the abutment friction collar 41 against the flywheel 38 which in turn is forced against the other friction collar 40 fixed on the shaft 33. The flywheel 38 is thus so arranged that rapid acceleration of the shaft 33 in either direction from a stop position will cause the flywheel 38 to move relative to the friction discs 40 and 41 which will tend to retard too rapid an acceleration and, conversely, will also prevent too rapid a deceleration of the shaft 33 and the connected gearing 35—34 and the screw 32 to thereby assist in smoothing out the energizing and de-energizing of the clutches 29 and 31 in applying power in one direction or another or stopping the rotation of the actuating screw 32.

Figure 2:
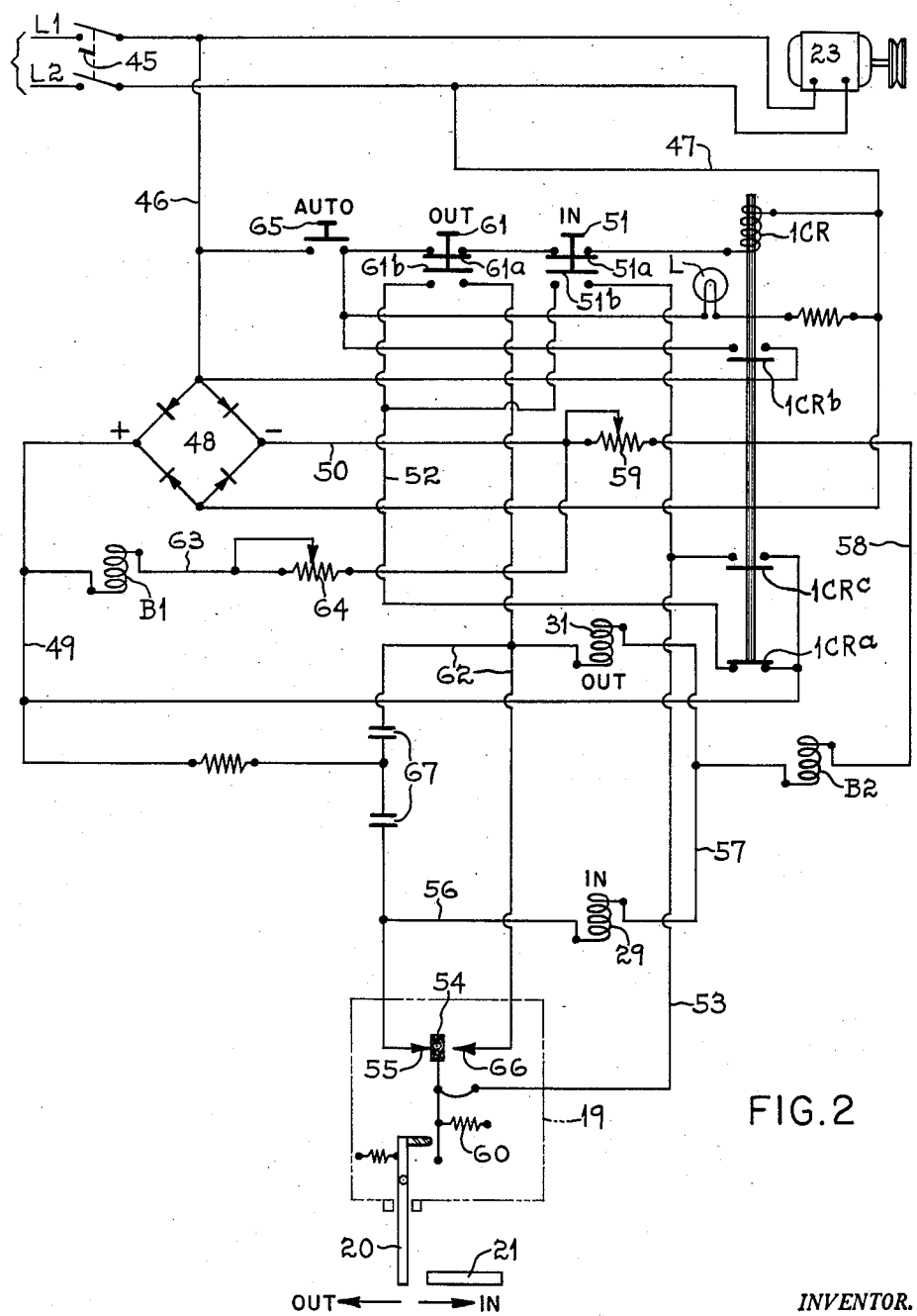
Figure 2 is an elementary wiring diagram showing the circuit of applicant's invention.

Referring more particularly to the elementary wiring diagram, Figure 2, power for operating the device is derived from a suitable single phase A. C. supply L—1 and L—2 which is connected when the main line switch 45 is closed to energize the drive motor 23 for continuous operation at constant speed. Power take-off from the leads L—1 and L—2 is transmitted through the leads 46 and 47 to the rectifier 48 which applies a positive direct potential to the lead 49 and a negative direct potential to the lead 50, assuming the tool slide 13 in retracted position, to the left in Figure 1, with the tool 16 completely away from the work and the tracer stylus away from the template 21, the tool slide may be initially moved in toward the work by pressing the in push button 51 which opens contact 51a and closes contact 51b to connect power from the lead 49 through normally closed contact 1CRa and the lead 52 through the lead 53, stylus operated contact 54 of the tracer and its contact 55, to the lead 56 to energize the in movement magnetic clutch 29 connected by the lead 57 through the coil B2 of the magnetic brake which in turn is connected through the lead 58, the variable resistor 59 to the lead 50. The tracer is so arranged that when its stylus 20 is free and released from contact with the template 21, a bias spring 60 maintains a contact 54 normally in contact with its contact 55.

When it is desired to move the tool out away from the work, the out push button 61 may be pressed, opening contact 61a and closing contact 61b which connects lead 49 through the normally closed contact 1CRa to the lead 62 which energizes the out magnetic clutch 31 which in turn is connected through the lead 57, the coil B2 of the magnetic brake, the lead 58, variable resistor 59 to the lead 50. The in push button 51 and the out push button 61 are momentary contact buttons which normally have their contacts 51a and 61a closed when released.

The magnetic brake B having the coils B1 and B2 is so constructed that the brake is set to prevent rotation of the screw 32 when only coil B1 is energized and the brake is released when both coils B1 and B2 are energized. Since the coil B1 is continuously energized from lead 49 through the lead 63, variable resistor 64 and the lead 50 and the coil B2 is energized only when the in magnetic clutch 29 or the out magnetic clutch 31 is energized, as described, the brake is released when either of these magnetic clutches 29 or 31 is energized and the brake is set when both of these clutches are de-energized.

To effect automatic operation, the automatic momentary contact push button 65 is pressed, completing a circuit from the lead 46 through the normally closed contacts 61a and 51a to energize the relay coil 1CR in turn connected to the lead 47. This causes contact 1CRb to close to hold in coil 1CR after the momentary automatic push button 65 is released. Contact 1CRa is also opened at this time while contact 1CRc is closed. Power is then applied from the lead 49 through the closed contact 1CRc and the lead 53 to the contact 54 of the tracer 19 which, at this time, has its stylus 20 away from the template 21 so that contact 54 is in engagement with contact 55, completing a circuit through the lead 56 to the in magnetic clutch 29 to energize this clutch to cause the tool slide to move toward the work, bring the tool 16 up to cutting position, and to bring the stylus 20 of the tracer into engagement with the template 21.

When the tracer stylus 20 engages the template 21, the contact 54 is moved to a neutral position, breaking its connection with the contact 55 to thus de-energize the in magnetic clutch 29 and stop further in movement of the tool slide 13. The feeding movement of the carriage 11 along the bed may now be instituted to cause the tracer stylus 20 to follow along the contour surface 21a of the template 21 and thus actuate the tracer so as to move the contact 54 either into contact with the contact 55 or with contact 66 for alternately energizing and de-energizing the in and out magnetic clutches 29 and 31 to effect controlled positioning of the tool slide 13 in response to the shape and configuration of the surface 21a on the template 21. During this alternate operation of the in and out magnetic clutches 29 and 31, of course the brake B is also automatically operated by energizing and de-energizing its coil B2 as described so that whenever one of the in or out magnetic clutches is de-energized the brake B immediately becomes effective to stop rotation of the screw 32 and whenever one of these magnetic clutches 29 or 31 is energized, the brake is immediately released. It is also to be noted that whenever a magnetic clutch is energized to effect a drive to the screw 32 in one direction or the other or when these magnetic clutches are de-energized, the acceleration and deceleration is further damped, in addition to the operation of the brake B, by the friction damping flywheel 38, as described. Thus the simultaneous functioning of the brake B and the frictional damping flywheel 38 in conjunction with the alternate energizing of the in and out magnetic clutches 29 and 31 effects a highly accurate and precise control of the tool movements in response to the configuration of the surface 21a on the template 21, the operation being performed with the substantial elimination of all hunting and irregular movements of the tool so that the work surface is reproduced faithfully in response to the exact configuration desired.

It is to be noted that if either the in push button 51 or the out push button 61 is depressed, the automatic control cycle is stopped so that the operator immediately resumes manual control of the servo mechanism. Whenever either of these push buttons 51 or 61 are depressed, their respective contacts 51a and 61a break the circuit to the relay ICR so as to again open the contacts ICRb and ICRc and reestablish the contact ICRa for manual control of the in and out clutches 29 and 31 as described. An indicating light L may also be preferably used to indicate that the automatic control has been established for starting the length feed of the lathe in actuating the carriage 11 along the bed 10 to give a further degree of nicety and safety of control for the lathe. Also, arc suppressing means comprising the two capacitors 67 may be utilized to suppress the arc on the push buttons 51 and 61 of the manual control and also to suppress the arc between the contacts 54, 55, and 66 of the tracer 19.

There has thus been provided an electrically operated servo power actuator in which a tool slide is accurately controlled in a duplicating movement in response to a template by electrical control means including a pair of clutch devices for actuating the tool slide in one direction or the other, together with a brake for stopping movement of the tool slide and a damping flywheel connected in the transmission system operable in an automatic manner to perform the improved tracer control operation.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In an electrically operated servo power actuator, a prime mover, a pair of input clutch drive shafts, transmission means for simultaneously driving said input clutch shafts in the same direction of rotation from said motor, a pair of output clutch shafts, a magnetic clutch interconnected between each of said output clutch shafts and said input clutch shafts, reversing gearing interconnected between said output clutch shafts, a driven shaft directly connected to be driven from one of said output clutch shafts, a magnetic brake on said driven shaft effective to arrest rotation of said output clutch shafts and said driven shaft, a friction damping flywheel arranged to be driven by the other of said output clutch shafts, an electrical circuit interconnected between said magnetic clutches and magnetic brake including a tracer control switch operable to a neutral position of engagement of said brake and release of said clutches and operable to two other positions of release of said brake and engagement of one or the other of said clutches.

2. In an electrically operated servo power actuator, a prime mover, a pair of magnetic clutches driven from said prime mover, clutch output shafts from said clutches, an actuating screw, reversing gearing interconnected between said clutch output shafts, means connecting said actuating screw directly to one of said clutch output shafts, a magnetic brake connected to said clutch output shaft connected to said actuating screw to arrest rotation thereof, a friction damping flywheel connected to the other of said clutch output shafts, and an electrical tracer control switch electrically connected to said clutches and said brake providing the sole means for accurately rotatively positioning said actuating screw in accordance with the actuation of said tracer control switch.

NELSON D. COOPER.

REFERENCES CITED

The following references are of record in the file of this patent:

UNITED STATES PATENTS

| Number | Name | Date |
|---|---|---|
| Re. 22,140 | Lochman | July 21, 1942 |
| 1,771,192 | Schenker | July 22, 1930 |
| 1,938,855 | Moyer | Dec. 12, 1933 |
| 1,948,617 | Hoagland | Feb. 27, 1934 |
| 2,069,508 | Rutemiller | Feb. 2, 1937 |
| 2,114,835 | Fouquet | Apr. 19, 1938 |
| 2,176,897 | Fodor | Oct. 24, 1939 |
| 2,190,988 | Johnasen | Feb. 20, 1940 |
| 2,236,756 | Kunkel | Apr. 1, 1941 |
| 2,351,626 | Muller | June 20, 1944 |
| 2,386,402 | Lilja | Oct. 9, 1945 |
| 2,428,973 | Kelsey | Oct. 14, 1947 |
| 2,435,280 | Jaeger | Feb. 3, 1948 |
| 2,470,103 | Lochman | May 17, 1949 |
| 2,482,134 | Tice | Sept. 20, 1949 |